US012764850B2

(12) United States Patent
Astakhov et al.

(10) Patent No.: US 12,764,850 B2
(45) Date of Patent: Oct. 13, 2026

(54) TARGET MATERIAL, HIGH-BRIGHTNESS EUV SOURCE AND METHOD FOR GENERATING EUV RADIATION

(71) Applicants: ISTEQ B.V., Eindhoven (NL); ISTEQ GROUP HOLDING B.V., Eindhoven (NL)

(72) Inventors: Dmitrii Igorevich Astakhov, Moscow (RU); Samir Ellwi, Crawley (GB); Denis Aleksandrovich Glushkov, Nieuwegein (NL); Vladimir Vitalievich Ivanov, Moscow (RU); Oleg Borisovich Khristoforov, Moscow (RU); Konstantin Nikolaevich Koshelev, Moscow (RU); Mikhail Sergeyevich Krivokorytov, Kirov (RU); Vladimir Mikhailovich Krivtsun, Moscow (RU); Aleksandr Andreevich Lash, Moscow (RU); Vyacheslav Valerievich Medvedev, Moscow (RU); Aleksandr Yurievich Vinokhodov, Moscow (RU)

(73) Assignee: ISTEQ GROUP HOLDING B.V., Eindhoven (NL)

( * ) Notice: Subject to any disclaimer, the term of this patent is extended or adjusted under 35 U.S.C. 154(b) by 361 days.

(21) Appl. No.: 18/707,625

(22) PCT Filed: Jan. 17, 2023

(86) PCT No.: PCT/EP2023/050981
§ 371 (c)(1),
(2) Date: May 6, 2024

(87) PCT Pub. No.: WO2023/135322
PCT Pub. Date: Jul. 20, 2023

(65) Prior Publication Data

US 2026/0020134 A1 Jan. 15, 2026

(30) Foreign Application Priority Data

Jan. 17, 2022 (RU) ........................... RU2022100914

(51) Int. Cl.
*H05G 2/00* (2006.01)

(52) U.S. Cl.
CPC ......... *H05G 2/0094* (2024.08); *H05G 2/0035* (2024.08); *H05G 2/0082* (2024.08)

(58) Field of Classification Search
CPC ... H05G 2/0094; H05G 2/0082; H05G 2/0035
See application file for complete search history.

(56) References Cited

U.S. PATENT DOCUMENTS

2010/0097593 A1* 4/2010 Murakami .......... G03F 7/70033 250/493.1

* cited by examiner

*Primary Examiner* — Georgia Y Epps
*Assistant Examiner* — Hanway Chang
(74) *Attorney, Agent, or Firm* — Nadya Reingand

(57) ABSTRACT

The invention relates to plasma source comprising a target material to produce the plasma emitting EUV radiation. The target material comprises a Li-based alloy with at least one further element selected from the group consisting of Ag, Au, Bi, Ba, Sr. The alloy is configured to increase the density of the target material by more than three times compared to the density of Li. As a result, compared with the Li target, the velocity of the droplet fraction of debris particles may be sharply reduced, which makes it possible to control the direction of its exit from the plasma due to the high velocity of the target. The plasma source is preferably a laser-produced plasma light source with a fast rotating target (at least 100 m/s). The target material may allow the creation of compact low-debris EUV light sources with high spectral brightness designed for a wide range of applications.

16 Claims, 8 Drawing Sheets

Target material: Li

Target material: 80% Li+20% Ag

TARGET MATERIAL, HIGH-BRIGHTNESS EUV SOURCE AND METHOD FOR GENERATING EUV RADIATION

CROSS-REFERENCES

This patent application is a National stage application from PCT application PCT/EP2023/050981 filed Jan. 17, 2023, which claims priority to Russian patent application RU2022100914 filed Jan. 17, 2022, currently issued as a patent RU2789275; the current application also is a Continuation-in-part of U.S. patent application Ser. No. 18/519,456 filed Nov. 27, 2023, which in turn is a Continuation-in-part of U.S. patent application Ser. No. 17/569,737 filed Jun. 6, 2022, which in turn is a Continuation-in-part of U.S. patent application Ser. No. 16/952,587 filed Nov. 19, 2020, currently issued as a U.S. Pat. No. 11,252,810, which in turn is a Continuation-in-part of U.S. patent application Ser. No. 16/773,240 filed January 27, currently issued as a U.S. Pat. No. 10,887,973, 2020, which in turn is a Continuation-in-part of U.S. patent application Ser. No. 16/535,404, currently issued as a U.S. Pat. No. 10,588,210, filed on Aug. 8, 15 2019, which in turn is a Continuation-in-part of U.S. patent application Ser. No. 16/103,243, currently issued as a U.S. Pat. No. 10,638,588, filed on Aug. 14, 2018, with priority to Russian patent application RU2017141042 filed Nov. 24, 2017.

FIELD OF THE INVENTION

The invention relates to a Li-containing target material for use in a plasma source, as well as to high-brightness extreme ultraviolet (EUV) light sources and a method for generating EUV radiation, which may include mitigation of debris particles generated by a plasma along with radiation.

BACKGROUND OF THE INVENTION

High-brightness EUV light sources are used in many fields: microscopy, materials science, biomedical and medical diagnostics, materials testing, crystal and nanostructure analysis, atomic physics, and lithography.

Synchrotrons can be used as such radiation sources, but they are extremely expensive and not available everywhere.

An alternative is sources in which plasma effectively emitting in the EUV (10-20 nm) range can be obtained both by focusing the radiation of high-power lasers on the target and in the discharge. The EUV light generation is most effective with the use of laser-produced plasma (LPP).

The development of EUV light sources, radiating at a spectral range (13.5±0.135 nm) corresponding to the reflection band of multilayer Mo/Si mirrors, in recent years has been largely stimulated by the development of projection EUV lithography for high-volume manufacturing of chips with 7 nm node and below.

For highly efficient generation of EUV radiation at 13.5 nm, it is known to use high-temperature plasma of a number of elements, in particular, xenon (Xe), lithium (Li), tin (Sn). Unlike other materials, the use of Li as a material of target makes it possible to obtain practically monochromatic radiation from a single resonant transition of hydrogen-like Li2+ at a wavelength of 13.5 nm. Measured linewidth of the Li2+ emission at 13.5 nm was limited by the spectral resolution of the spectrograph and was estimated to $\lambda/\Delta\lambda \approx 1800$, as it is known from the publication Schriever G, et al. Laser-produced lithium plasma as a narrow-band extended ultraviolet radiation source for photoelectron spectroscopy. Appl Opt. 1998 Mar. 1; 37(7):1243-8.

Production of radiating lithium plasma is known using methods that include: discharge in metal vapors initiated by a laser, U.S. Pat. No. 7,427,766, publ. 23, Sep. 2008; production of laser plasma with droplet Li target, U.S. Pat. No. 7,449,703, publ. 11.110.2008, and with jet Li target, U.S. Pat. No. 9,476,841, publ. 25, Oct. 2016, all of which are incorporated herein by reference.

Thus, essentially, a point and monochromatic radiation source based on Li-plasma is attractive for numerous applications with the possibility of using various optical systems: based on multilayer Mo/Si mirrors having a high (70%) reflection coefficient at 13.5 nm, and/or based on Fresnel zone plates, etc. One of the advantages of using Li as a material of target is due to its relatively low melting point, 160.54° C.

However, during production of EUV radiation, debris particles are produced as a by-product, which can degrade the surface of optics integrated with the EUV light source. The debris, generated as a by-product of the plasma during the EUV light source operation, can be in the form of high-energy ions, neutral atoms and clusters or microdroplets of target material.

From the international patent application PCT/RU2012/000701, published under the number WO 2013/122505 A1 included here by reference, a short-wavelength radiation source based on laser-initiated discharge produced plasma in metal vapor is known. The electrodes can be in the form of liquid metal jets or in the form of rotating disks wetted with the molten target material. The laser beam is directed at the irradiation site of one of the electrodes in such a way that the discharge has a curved, banana-like shape. The intrinsic magnetic field of such a discharge has a gradient that determines the predominant movement of the discharge plasma flow into the region of a less strong magnetic field in a direction significantly different from the direction of the EUV beam output. The invention provides a simple and highly effective suppression of charged particles in the radiation beam.

However, suppression of the flow of neutral particles and microdroplets requires more sophisticated means for debris mitigation.

In patent applications PCT/RU 2018/000520 published on May 31, 2019 under the number WO 2019103648, PCT/EP2020/061562 published on Oct. 29, 2020 under the number WO 2020216950 and patent RU2743572 published on Feb. 20, 2021, a new approach has been proposed for the development of high-brightness LPP light sources based on a fast rotating, linear velocity of about 100 m/s, liquid metal target, which provides highly efficient debris mitigating by redirecting of the droplet fraction of debris particles away from the optical collector and the input window for the laser beam. This method for debris mitigation is highly effective when using target material with a sufficiently high density $\rho$, for example, tin with $\rho$=7.31 g/cm$^3$.

However, the use of Li as a target material is characterized by an excessively high rate of formation of the droplet fraction of debris particles due to the low density of the material of target ($\rho$=0.534 g/cm$^3$), fragments of which, as a result of the impact of explosive-type shock pulses in the interaction zone, acquire speeds reaching 1000 m/s, which dramatically reduces the effectiveness of protection against the droplet fraction of Li-target debris.

SUMMARY OF THE INVENTION

Accordingly, there is a need to eliminate the drawbacks mentioned above. In particular, there is a need for improved LPP EUV light sources with high spectral brightness at 13.5 nm using lithium as a plasma-forming target material. It would further be beneficial if the light source would be compact, powerful, and provide highly efficient, preferably an almost complete, debris mitigation.

This need is met by the features of the independent claims. The dependent claims describe embodiments of the invention.

According to an embodiment of the invention, there is provided a target material for use in a plasma source constructed and arranged to generate a radiation beam having a wavelength in an extreme ultraviolet (EUV) range, said target material comprising a lithium (Li)-based composition with at least one further element, configured for multiple, more than three times, increasing the density of the target material compared to the density of Li.

In the preferred embodiment of the invention, the further element is selected from the group comprising or consisting of Ag, Au, Bi, Ba, Sr.

In the preferred embodiment of the invention, the composition comprises an eutectic alloy. The atomic percentage (or amount-of-substance fraction) of Li in the target material may be in the range from 60% to 90% (which may also be written as at %).

In the preferred embodiment, the atomic percentage of the at least one further element in the target material may be in the range from 10% to 40%, for example from 15% to 30%. Preferably, the sum of the atomic percentage of Li and of the at least one further element in the target material amount to (about) 100%. The term 'about' may refer to a remainder of impurities and/or contaminants that may be present, for example in dependence on the purity of the source materials from which the target material is formed.

In another aspect, the invention relates to a plasma source of EUV radiation characterized in that the plasma is produced from the target material made in accordance with the present invention.

In a preferred embodiment of the invention, plasma is either a laser produced plasma (LPP) or a laser-initiated discharge produced plasma.

In the preferred embodiment of the invention, a speed of a droplet fraction of debris particles ejected from the plasma of the target material is many times, about an order of magnitude, less compared to the speed of the droplet fraction of debris particles ejected from plasma of a lithium target.

In the preferred embodiment of the invention, a target speed is greater or equal to the average speed of the droplet fraction of debris particles ejected from the plasma.

In another aspect, the invention relates to a method for generating EUV radiation comprising generating a radiation beam having a wavelength in an EUV range by means of a plasma source using a target material having any of the configurations described herein.

In an embodiment, the method may further comprise: forming under an action of a centrifugal force a target as a layer of molten target material on a surface of annular groove, implemented in a rotating target assembly with target surface facing a rotation axis; irradiating, preferably at a pulse repetition rate, e.g. a high pulse repetition rate such as higher than 10 kHz, the target by a focused laser beam; generating the laser produced plasma in an interaction zone and outputting an EUV radiation beam through the means for debris mitigation. Said molten target material comprises any of the target material disclosed herein, in particular a Li-based composition with at least one further element, configured for multiple, more than three times, increasing the density of the target material compared to the density of Li. The target is rotated at a high linear velocity of at least 100 m/s.

In a preferred embodiment of the invention, the centrifugal acceleration of the target is at least 10,000 g, where g is the acceleration of gravity.

In the embodiment of the invention, a spatial distribution of a debris ejection rate from the interaction zone is calculated and directions of a passage of both the focused laser beam and the EUV radiation beam are selected in spatial regions with minimal debris ejection rates.

In a preferred embodiment of the invention, the debris mitigation is provided by one or more debris mitigation techniques, comprising: protective gas flow, a magnetic mitigation, a foil trap, a debris shield, a membrane mostly transparent for EUV radiation, with a transparency of more than 60%.

In the preferred embodiment of the invention, in the EUV radiation beam, the spectral filtering of narrow-band radiation is provided at the transitions of ionized Li2+ with a wavelength of 13.5 nm.

In another aspect, the invention relates to an EUV radiation source comprising: a vacuum chamber, a rotating target assembly supplying a target into an interaction zone with a laser beam, preferably a pulsed laser beam, focused onto the target which is a layer of molten target material on a surface of an annular groove implemented in a rotating target assembly with a target surface facing a rotation axis, an EUV radiation beam exiting the interaction zone, and means for debris mitigation.

The EUV radiation source differs in that the target material is made in accordance with any of the embodiments of the present invention, and the linear velocity of the target is preferably at least 100 m/s.

In the preferred embodiment of the invention, a spectral purity filter is installed in the way of the EUV radiation beam.

The spectral purity filter is selected from the group comprising or consisting of: a reflective filter in the form of a multilayer Mo/Si mirror, foil containing zirconium or beryllium.

In the preferred embodiment of the invention, means of debris mitigation are provided by one or more debris mitigation techniques, comprising: protective gas flow, a magnetic mitigation, a foil trap, a debris shield, a membrane mostly transparent for EUV radiation.

The following causal relationships may exist between preferred features of the present invention and the achieved technical result.

According to an embodiment, the addition of a small amount of a further element to the Li-based target material (with Li density $\rho$=0.534 g/cm$^3$), for example, 10% to 40%, e.g. about 20%, of the atomic fraction (or amount-of-substance fraction) of Ag ($\rho$=10.5 g/cm$^3$) or Au ($\rho$=19.32 g/cm$^3$) practically does not change the intensity of the 13.5 nm emission line of lithium plasma.

At the same time, the density of the target material, which can be called "heavy lithium" increases many times: 4.7 or 8 times, respectively, compared with the density of Li, and the melting point remains relatively low: about 150° C. for an alloy with Ag and 280° C. for alloy with Au. In turn, a higher density of the target material leads to a multiple decrease in the velocity of the most problematic droplet fraction of debris particles, allowing to control the direction of its predominant ejection from the plasma when using a high target velocity (100 m/s or more).

The use of Ag and Au as the further element of the target material is preferable, since these materials are non-toxic, chemically non-aggressive and make it possible to obtain eutectic fusible alloys with a high (from 60 to 90%) proportion of Li content at a target density many times higher than the density of Li.

Additionally or alternatively, as a further element of the material of target, Bi (ρ=9.79 g/$cm^3$), Ba (ρ=3.5 g/$cm^3$), Sr (ρ=2.54 g/$cm^3$) can be used.

The plasma emission band of the further component of the target material is separated from the 13.5 nm emission line of doubly ionized lithium so that it can be easily cut off without the use of complex optical systems, for example, simply by reflection from a Mo/Si mirror, ensuring, in essence, the monochromaticity of the EUV source. Monochromaticity of the EUV source makes it possible to use a wide range of optical elements with it, which include multilayer Mo/Si mirrors, grazing-incidence mirrors, Fresnel zone plates, and expands the range of applications of essentially point (with a characteristic size of ~100 μm) radiation sources disclosed in the present invention.

In general, the invention is applicable to a number of EUV light sources based on laser produced plasma or laser-initiated discharge produced plasma.

In one aspect, the invention relates to a low-debris LPP EUV light source with fast rotating liquid metal target made of "heavy lithium", i.e. of the target material in any of the disclosed configurations.

In accordance with this, the present invention may provide the possibility of creating low-debris high-brightness monochromatic radiation sources at 13.5 nm with a wide range of applications.

The features of the aspect and embodiments disclosed herein may be combined with each other unless noted to the contrary.

The advantages and features of the present invention will become more apparent from the following non-limiting description of exemplary embodiments thereof, given by way of example with reference to the accompanying drawings.

BRIEF DESCRIPTION OF DRAWINGS

An exemplary implementation of the invention is illustrated by the drawings, in which.

In the drawings, the matching elements of the device have the same reference numbers.

These drawings do not cover and, moreover, do not limit the entire scope of the options for implementing this technical solution, but represent only illustrative material of a particular case of its implementation.

DETAILED DESCRIPTION OF THE INVENTION

Figure 1:
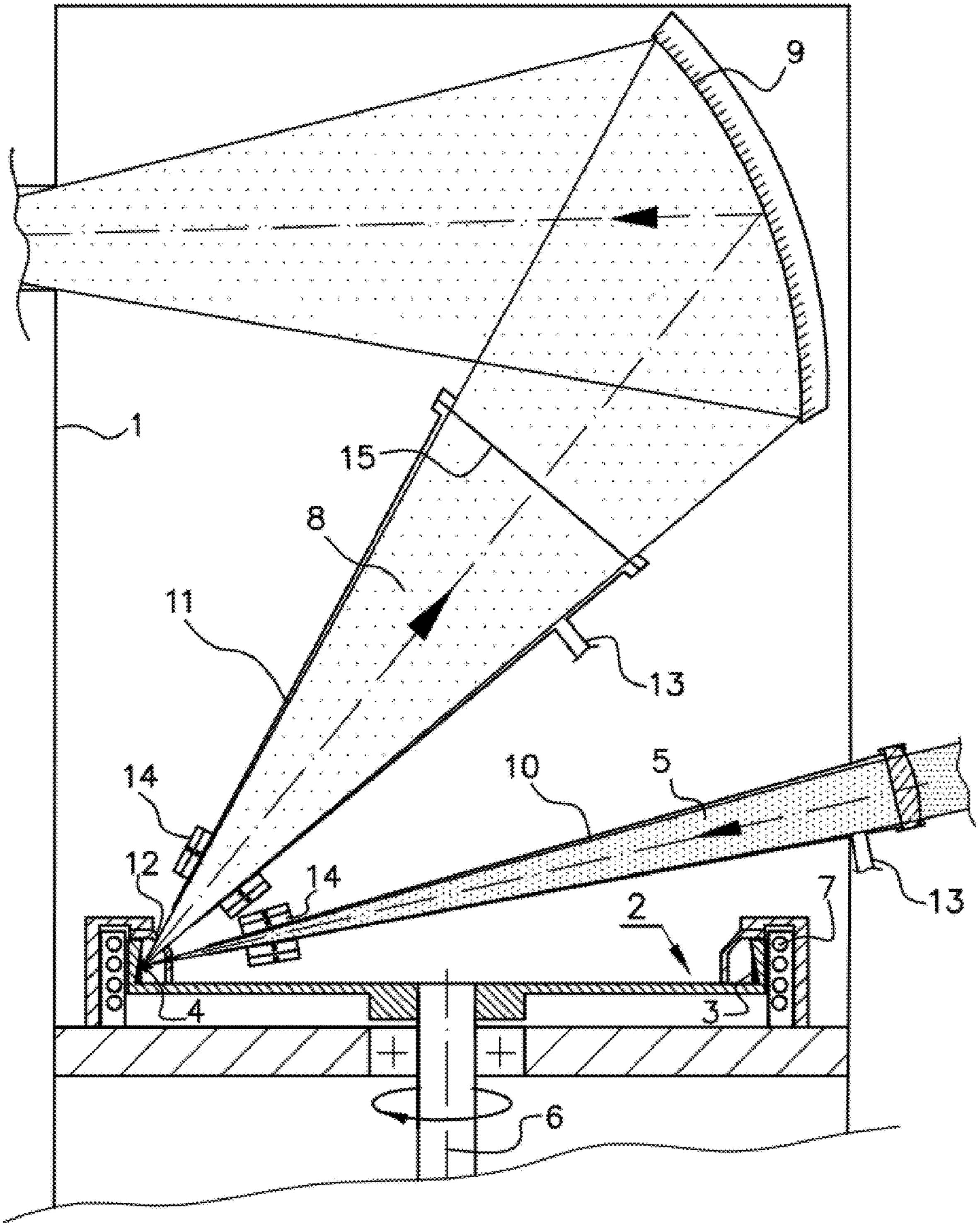
FIG. 1 is a schematic diagram of a high brightness LPP EUV light source with fast rotating target in accordance with an embodiment.

According to an exemplary embodiment of the invention illustrated in FIG. 1, the high-brightness source of short-wavelength radiation contains a vacuum chamber 1 with a rotating target assembly 2, which supplies a target 3 to the interaction zone 4 where the target 3 interacts with a focused laser beam 5. A part of the rotating target assembly 2 is made in the form of a disk fixed to the rotation shaft. Said disk has a peripheral portion in the form of an annular barrier with the annular groove facing the rotation axis 6. The target 3 is a layer of molten metal formed by centrifugal force on the surface of the annular groove of the rotating target assembly 2. The target 3 may employ the target material in any of the configurations disclosed herein.

Material of target is melted and maintained in a given optimal temperature range using a heating system 7.

The annular groove configuration prevents material of the target 3 from being ejected in the radial direction and in both directions along the rotation axis 6, if the target material volume does not exceed the groove's volume.

In the interaction zone 4, under the action of a focused laser beam 5, a pulsed high-temperature plasma of the target material is generated. The plasma generates radiation in the EUV spectral range. Generated EUV radiation leaves the interaction zone 4 in the form of a divergent beam of EUV radiation 8.

In the embodiment of the invention, the beam of EUV radiation is directed at the optical collector 9 in the form of a Mo/Si mirror with a maximum reflection at a wavelength of 13.5 nm. In other cases, a collector based on glazing incidence mirrors or optical elements in the form of Fresnel zone plates can be used.

On the paths of the focused laser beam 5 and the beam of EUV radiation 8, there are means for debris mitigation, provided by one or more techniques comprising:

- casings 10, 11 surrounding the beams 5, 8 of laser and EUV radiation;
- protective gas flows directed through gas inlets 13 in the casings 10, 11 to mitigate the vapor fraction of debris particles in the path of laser and EUV radiation beams;
- debris shield 12, separated from the rotating target assembly 2 by slit gaps, having only two small holes (for the input of a focused laser beam and for the output of a beam of EUV radiation), through which debris particles can leave the target assembly;
- foil trap (not shown), highly transparent for plasma radiation which is essentially a system of plates oriented in radial directions with respect to the plasma, providing a sufficiently effective trapping of neutral atoms and clusters of the target material;
- a magnetic field preferably generated by permanent magnets to mitigate the charged fraction of debris particles; and a preferably replaceable membrane 15 essentially transparent for short-wavelength radiation and impermeable for debris and gas.

The membrane installed on the path of the EUV radiation beam is preferably made of a material belonging to a group which includes carbon nanotubes (CNT), Ti, Al, Si, ZrSi, BN.

Similar means for debris mitigation are placed in the propagation path of the focused laser beam 5.

Figure 2:
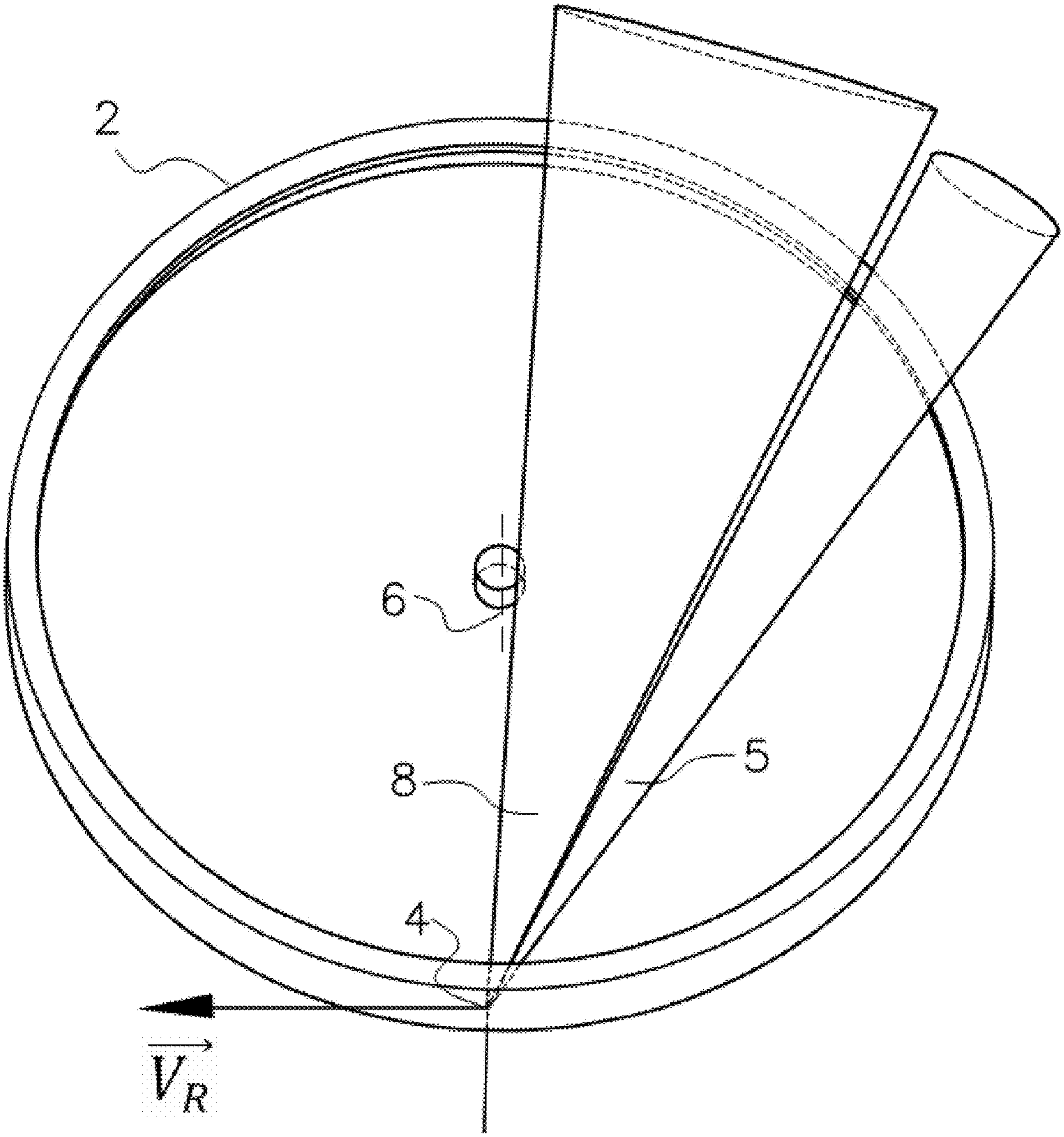
FIG. 2 is a simplified schematic of a high brightness LPP EUV light source in accordance with the embodiment, FIG. 3A and FIG. 3B—show diagrams that illustrate the results of calculating the spatial distribution of droplet ejection from the interaction zone for target materials of Li and composition with atomic fractions of Li (80%) and Ag (20%)

FIG. 2 shows a simplified diagram of the above-described EUV light source, for which computational modeling of spatial distribution of debris ejection from the interaction zone 4 performed using the RZLINE code which is created for applications in the field of radiation hydrodynamics of dense hot plasma. The code uses mathematical models based on years of experimental and theoretical work as, for example, it is known from the publication K. Koshelev, V. Ivanov, V. Medvedev, et al., "Return-to-zero line code modeling of distributed tin targets for laser-produced plasma sources of extreme ultraviolet radiation", Journal of Micro/Nanolithography, MEMS, and MOEMS Vol. 11, Issue 2 (May 2012). The code allows modeling the interaction of laser radiation with gases, liquids and solid surfaces with subsequent generation of plasma, as well as interaction with the plasma itself.

In FIG. 3 for Li and Li/Ag target materials are shown maps of the spatial distribution of ejection rates of debris particles (particles of all fractions of all velocities are taken into account) in experimental coordinates, in which θ—is the angle to rotation axis, ϕ—is the azimuthal angle lying in the plane of the figure. The origin of coordinates is in the interaction zone. Typical directions in the interaction zone are as follows:

I—parallel to the rotation axis: θ=0, ϕ—any,
II—along target velocity: θ=90°, ϕ=0°,
III—normal to the target surface: θ=90°, ϕ=90°,
IV—against target velocity: θ=90°, ϕ=180°.

Spatial distributions of the debris ejection rate shown in FIG. 3 were calculated in nm/(month-W) as a specific growth rate of the film thickness of deposited debris particles on a surface of the exposed sample located at a distance of 40 cm from the interaction zone per unit of laser power with the EUV source operating 24/7.

This distribution was obtained for typical values of the light source parameters: the laser radiation wavelength is ~1-2 μm, the laser pulse energy is several mJ at pulse duration of several ns, the focal spot diameter is several tens of μm and the target linear velocity is 200 m/s. Apart from the fast target rotation no other debris mitigation techniques were used.

As illustrated in FIG. 3, the mass of debris particles is mainly concentrated in the sector along the direction of the target velocity limited by the «azimuth angles» ϕ of 0°-80° and by the «polar angles» θ of 0°-90°. Maximum debris ejection rate along the direction of the target rotation is 107 nm/(month-W).

In FIG. 3 ovals are used to indicate the spatial regions selected in accordance with embodiments with minimal levels of debris ejection rates, in which the cones of laser and EUV radiation beams are located.

Figure 3A:
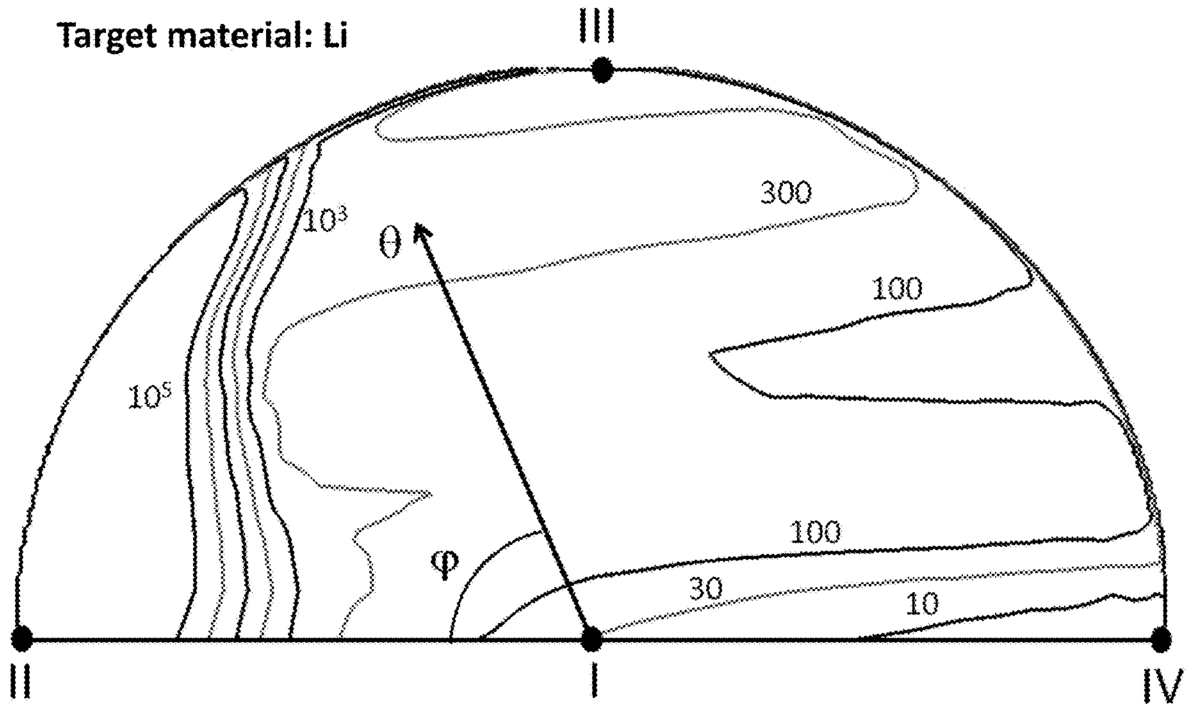
Figure 3B:
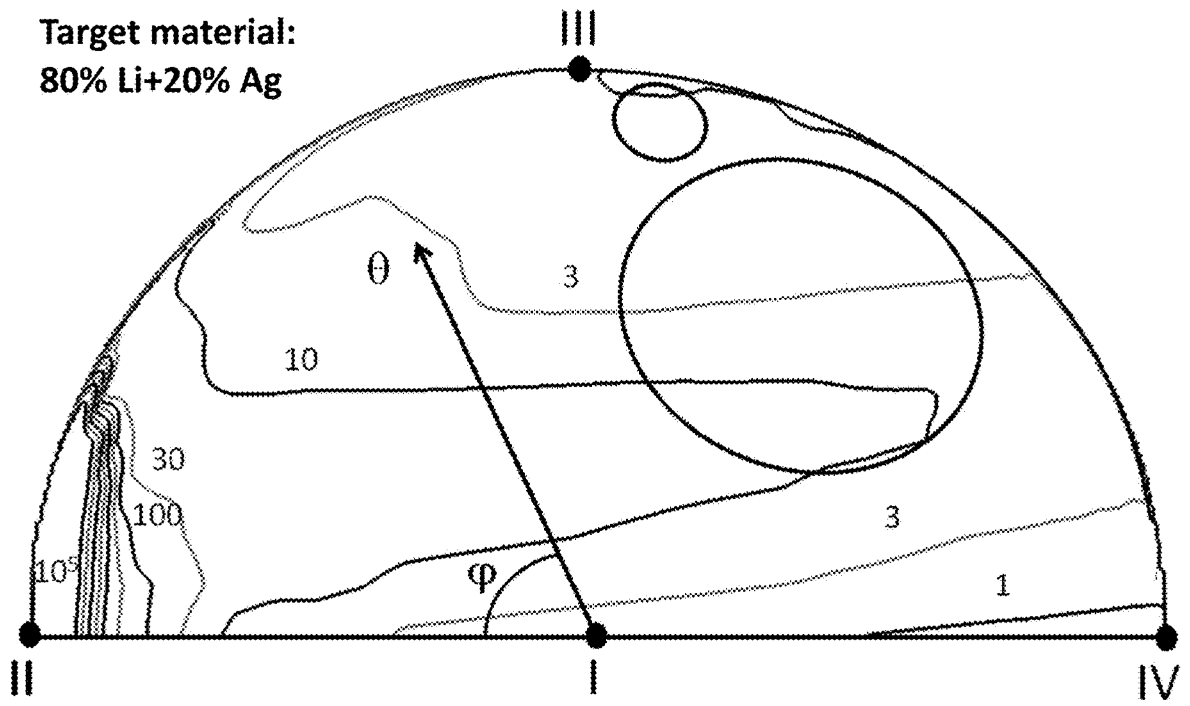

Calculation results for target materials from Li, FIG. 3A, and compositions of 80% Li and 20% Ag (in atomic fractions), FIG. 3B, show the following. The increase in the density of the target material (in this case by 4.7 times compared to lithium) makes it possible to sharply (by more than an order of magnitude) reduce the ejection rate of debris particles into the spatial regions of laser and EUV beams.

The achievement of this positive effect of the invention is confirmed experimentally using the source schematically shown in FIG. 1, in which the test sample was placed instead of the membrane 15.

Figure 4A:
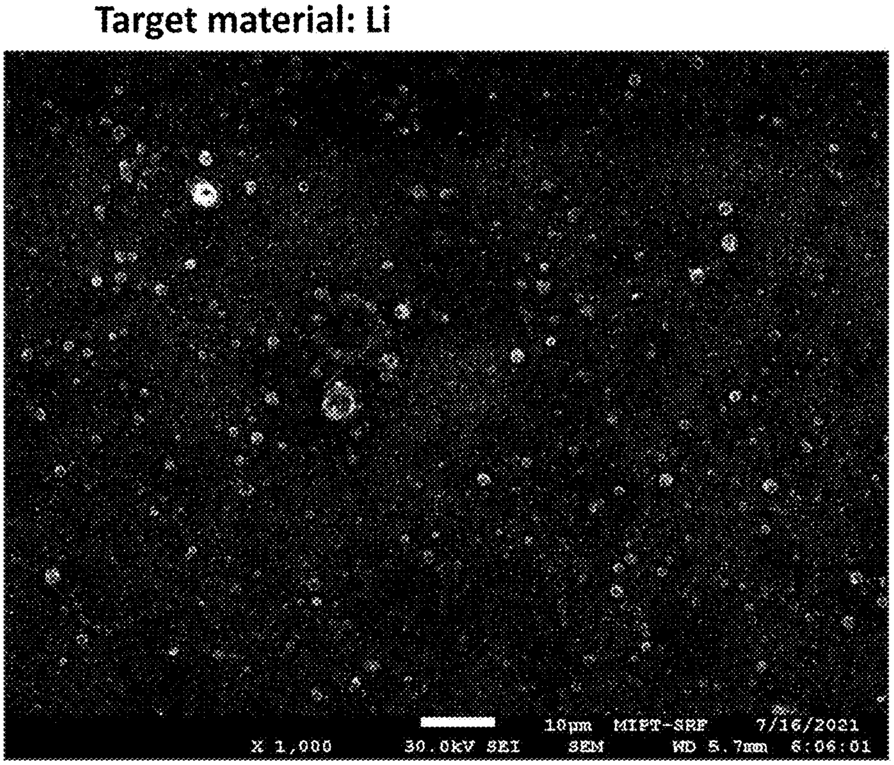
FIG. 4A and FIG. 4B show SEM images, demonstrating achievement of debris mitigation effect by replacing the Li target material with the composition 80% Li+20% Ag in the high brightness LPP EUV light source.
Figure 4B:
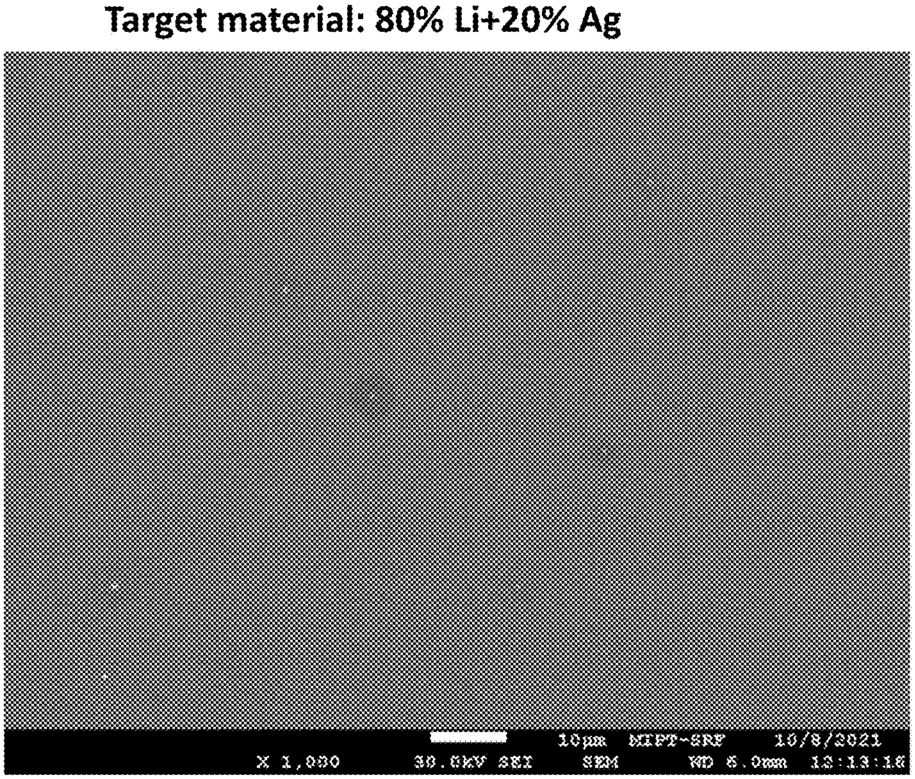

FIG. 4 shows scanning electron microscope (SEM) images of the witness samples obtained for target materials from Li, FIG. 4A, and compositions of 80% Li and 20% Ag, FIG. 4B. Frame size of SEM images is 125 μm. Tests were carried out under the following conditions:

linear velocity of the target is 150 m/s, centrifugal acceleration is 23000 g,
laser beam energy is 3.3 mJ/pulse on the target, focal spot size—120 μm at 1/e2 intensity level, pulse repetition rate—25 kHz,
exposure time of the witness samples is 2.5 hours (FIG. 4A) and 10 hours (FIG. 4B).

It can be seen that an increase in the density of the target material in accordance with the invention leads to a sharp debris mitigation effect.

Based on the tests performed, it was shown that relatively large droplets larger than 300 nm, which can penetrate through the CNT membrane, are completely suppressed. Thus, the replacement of the test sample with a replaceable membrane, in particular made of carbon nanotubes, allows for ultra-high purity of a high-brightness monochromatic radiation source at 13.5 nm, made in accordance with the present invention.

Figure 5A:
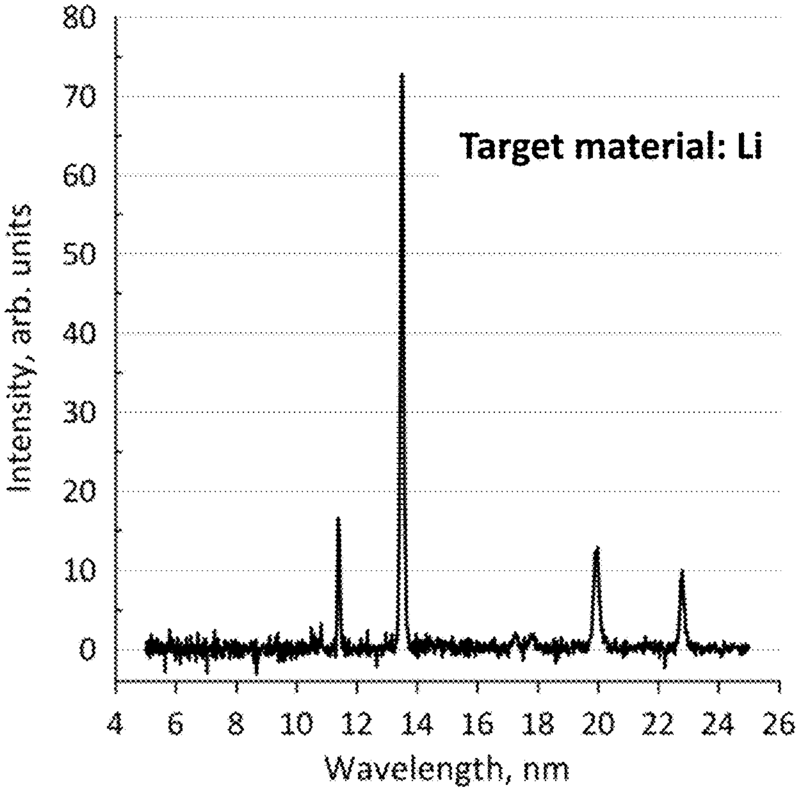
FIG. 5A and FIG. 5B show spectra of the EUV radiation source for the target material of Li and the composition of 80% Li+20% Ag.
Figure 5B:
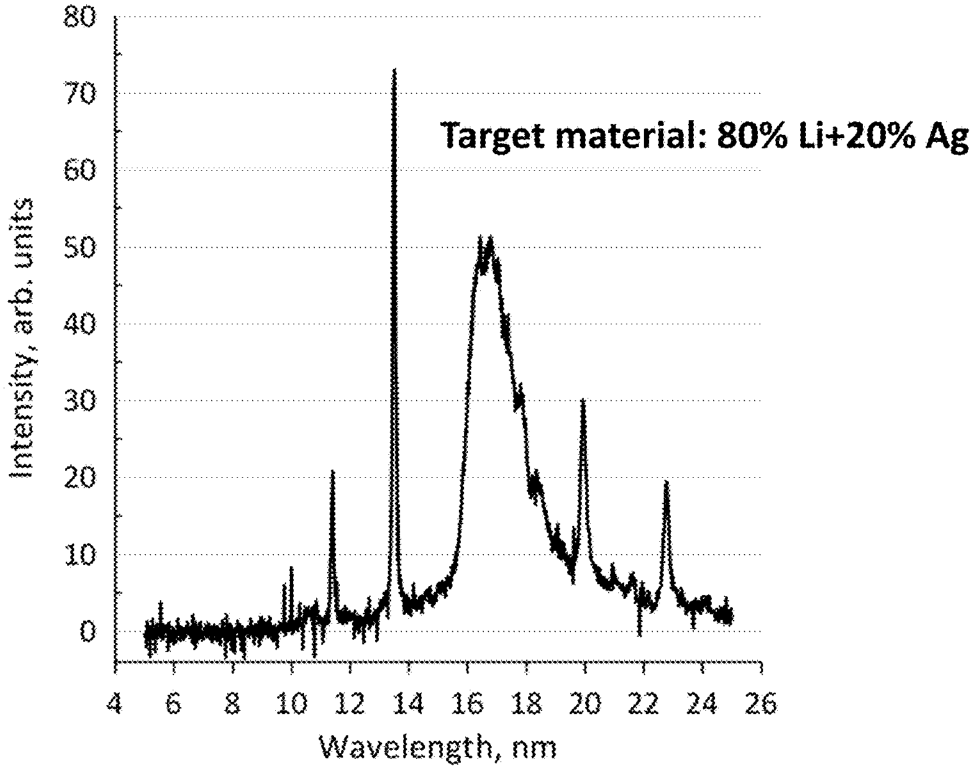

FIG. 5A and FIG. 5B show spectra of the EUV light source for the target material of Li and the composition of 80% Li+20% Ag, respectively. Spectra shown in FIG. 5 are measured using the EUV light source schematically shown in FIG. 1 for radiation coming directly from the plasma (without reflection from the mirror 9 and without the use of a membrane 15). It can be seen that the emission intensity of Li2+ line at 13.5 nm practically does not change when replacing the target material from Li with a composition of 80% Li+20% Ag. At the same time, due to the presence of Ag ions in the plasma, an emitting band with a peak at a wavelength of 17 nm appears which does not overlap with the emission line of Li2+ at 13.5 nm, which can be easily filtered out, for example, using a Mo/Si mirror 9, FIG. 1.

Figure 6:
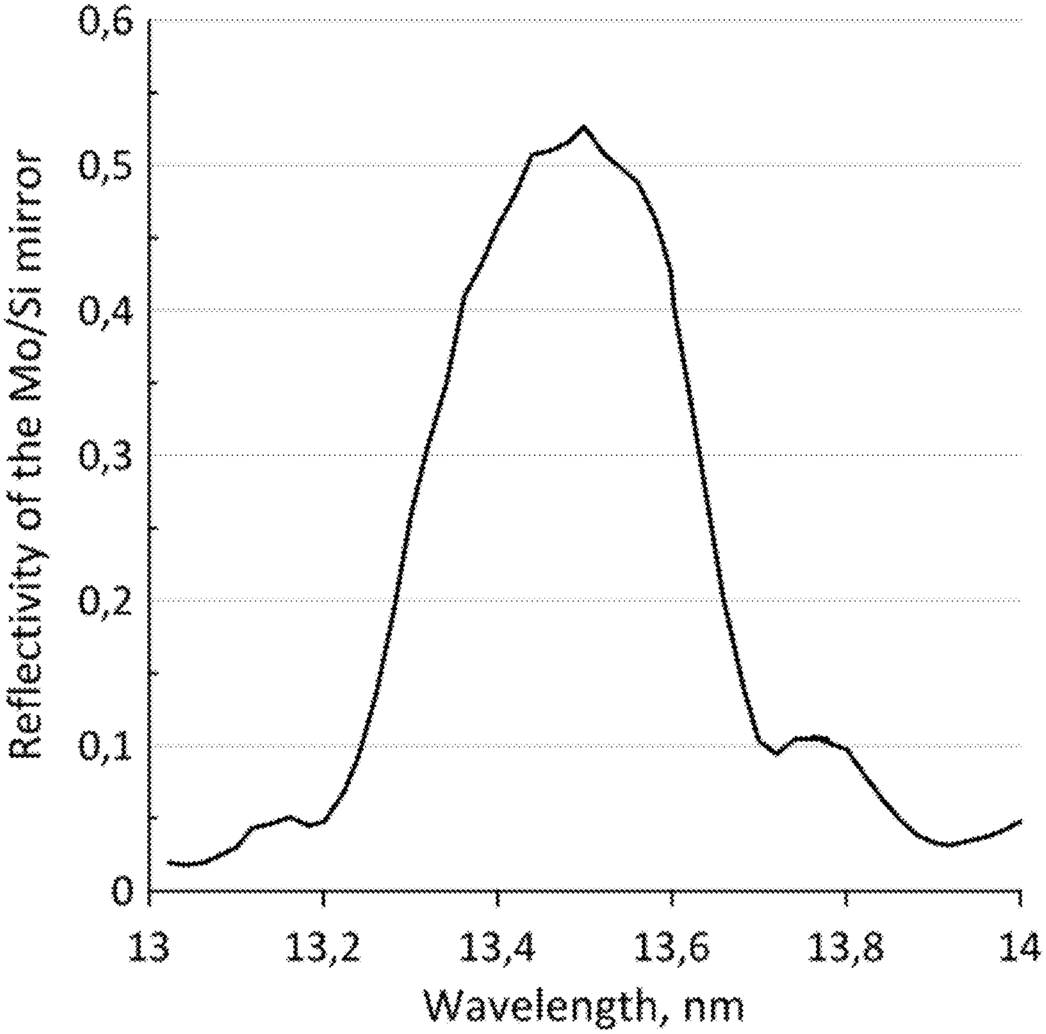
FIG. 6 shows a spectral reflectivity curve of the Mo/Si mirror used as a reflective filter.

FIG. 6 shows the spectral reflectivity curve of the Mo/Si mirror with a reflection band into which the radiation from the Ag plasma does not fall. This determines the possibility of using a multilayer Mo/Si mirror as a reflective filter in accordance with the present invention, not limited only to this option. Similarly, other types of filters can be used, for example, made from foils containing zirconium or beryllium.

Figure 7A:
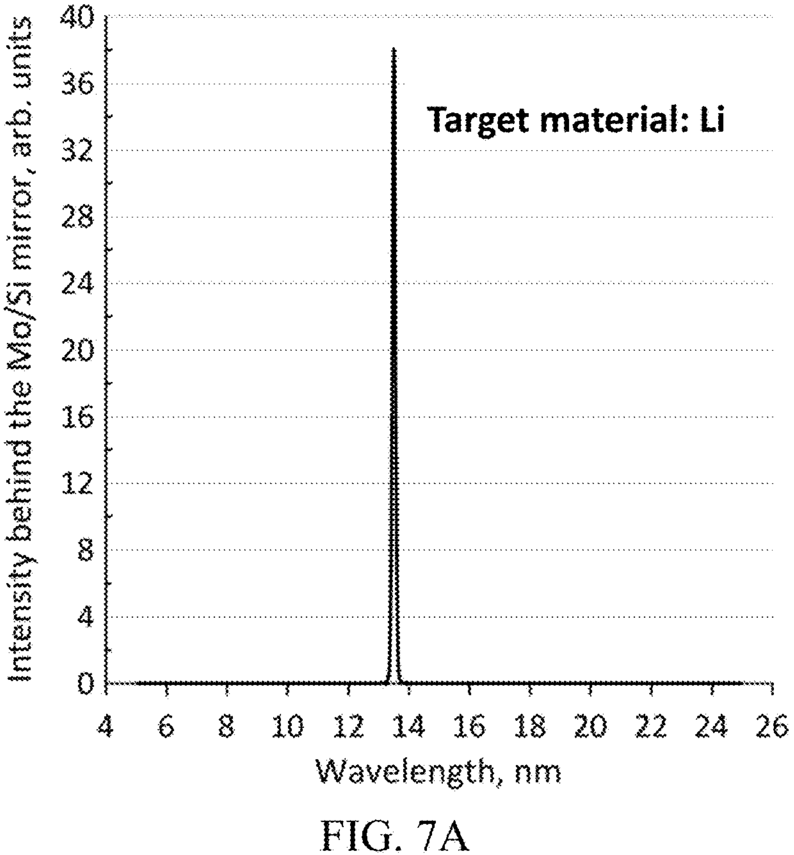
FIG. 7A and FIG. 7B show radiation spectra after reflection from a Mo/Si mirror for a target material of Li and a composition of 80% Li+20% Ag.
Figure 7B:
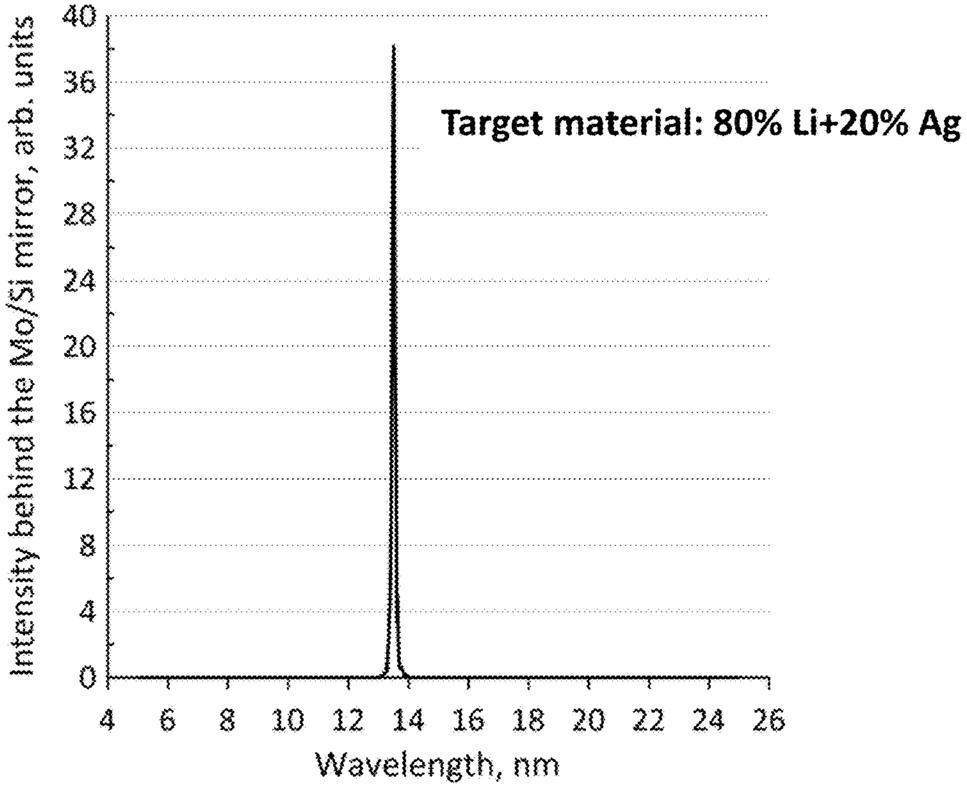

As can be seen from FIG. 7A and FIG. 7B, spectra of the EUV light source after reflection from the Mo/Si mirror practically coincide for the target materials of Li and the composition of 80% Li+20% Ag.

The radiation behind the multilayer mirror is monochromatic with a bandwidth of $\lambda/\Delta\lambda \geq 1300$. This value was estimated from measured bandwidths (a spectrometer with a spectral resolution $\lambda/\Delta\lambda$ up to 500 was used) of spectral lines Li2+ (1s−4p) at 10.8 nm, Li2+ (1s−3p) at 11.39 nm and Li2+ (1s−2p) at 13.5 nm, FIG. 5A.

In the EUV light source, the maximum conversion efficiency CE13.5 of laser radiation energy into in band EUV radiation (13.5±0.135 nm) in 2π sr spatial angle was 2% for both of these Li-based materials of target.

In general, there is a set of parameters, which includes the size of the laser spot, the energy and duration of the laser pulse, which provide, along with a high CE, a minimum amount of debris.

The method for generating radiation using a EUV light source, schematically shown in FIG. 1, FIG. 2 and FIG. 3 is implemented as described below.

Under the action of centrifugal force, the target is created in the form of a layer of molten metal on the surface of an annular groove of a rotating target assembly 2, the surface facing the rotation axis 6. The target 3 is irradiated by a pulsed focused laser beam 5 resulting in the formation of plasma in the interaction zone 4. The output beam of EUV radiation 8 is generated passing into an optical collector 9 through the means for debris mitigation 11, 12, 13, 14, 15.

The rotation of the target is carried out with a high linear velocity, not less than 100 m/s. In accordance with the embodiments disclosed herein, a target material containing a lithium composition with at least one further element is used, which makes it possible to increase multiple times, e.g. more than three times, the density of the material of target compared to the density of Li and thereby dramatically reduce the ejection rate of droplet fraction of debris particles. The droplet fraction of debris particles, due to the fast target rotation, acquires a significant tangential component of the velocity comparable to the velocity of droplet flyout, which, in accordance with the invention, is sharply reduced by increasing the density of the Li-containing target material. As a result, the velocity vector of the droplet fraction of debris particles is directed away from the beams 5, 8 of laser and EUV radiation, the propagation paths for which are chosen in spatial regions with minimal levels of debris ejection rate.

Ag or Au is preferably chosen as a further element of the target material, which makes it possible, even with its small, e.g. 20%, atomic fraction, to increase the density of the target material many times (about 5 and 8 times, respectively) compared to the density of Li. In preferred embodiments of the invention, the material of target is a eutectic alloy in which the atomic fraction of Li is in the range from 60% to 90%, which ensures the uniformity of the target material and its relatively low melting point.

Bi, Ba, Sr can also be used as a further element of the target material.

In the EUV radiation beam 8, spectral filtering of narrowband line emission of Li2+ at 13.5 nm is carried out, for example, using a Mo/Si mirror 9, which plays the role of a reflective filter. Foils, in particular, containing zirconium or beryllium, can also be used as a filter.

When generating EUV radiation, means for debris mitigation 11, 12, 13, 14, 15 are used, comprising protective gas flow, magnets, a foil trap, a membrane 15 largely transparent at 13.5 nm, and a debris shield 12 installed outside the regions of propagation of laser and EUV radiation beams 5, 8.

When using fast target rotation with high target velocity of more than 100 m/s and centrifugal acceleration of at least 10000 g, the surface of the target 4 is round-cylindrical. As a result, a stable shape of the target surface 3 in the interaction zone 4 is ensured and long-term stability of the EUV radiation source is achieved due to continuous circulation and updating of the target material in the interaction zone and restoration of the shape of the target surface after the next laser pulses.

In general, the target material made in accordance with the present invention is applicable to a wide range of EUV light sources of various types known from the prior art, both based on laser produced plasma and discharge produced plasma.

For example, FIG. 8 shows embodiments of the EUV light sources using a target material made in accordance with embodiments of the present invention.

Figure 8A:
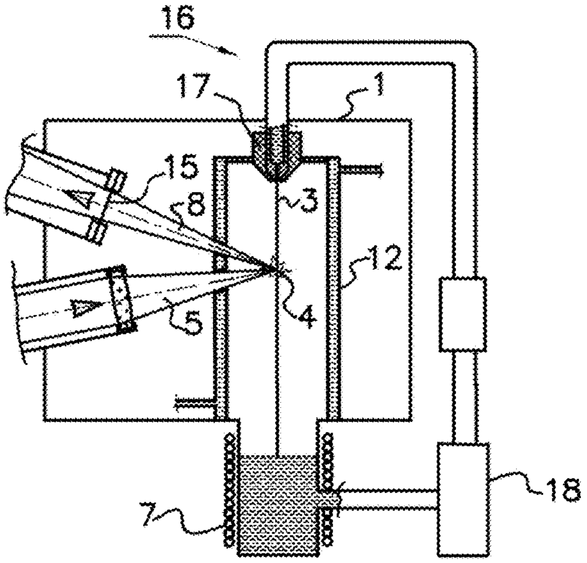
FIG. 8A, FIG. 8B, FIG. 8C and FIG. 8D show simplified schematics of the EUV light source in accordance with the embodiments of the invention.

In FIG. 8A the LPP EUV light source has the target 3 in the form of liquid metal jet circulating at high speed through the interaction zone 4 along a closed loop 16 with a nozzle 17 and a high-pressure pump 18 for transferring molten target material. A debris shield 12 with a temperature exceeding the melting point of target material is installed around the jet. The jet can be continuous or consist of individual target droplets following each other at high speed. Other parts of the device in this embodiment are the same as in the above embodiments (FIG. 1, FIG. 2), have the same item numbers in FIG. 8, and their detailed description is omitted here and below.

Figure 8B:
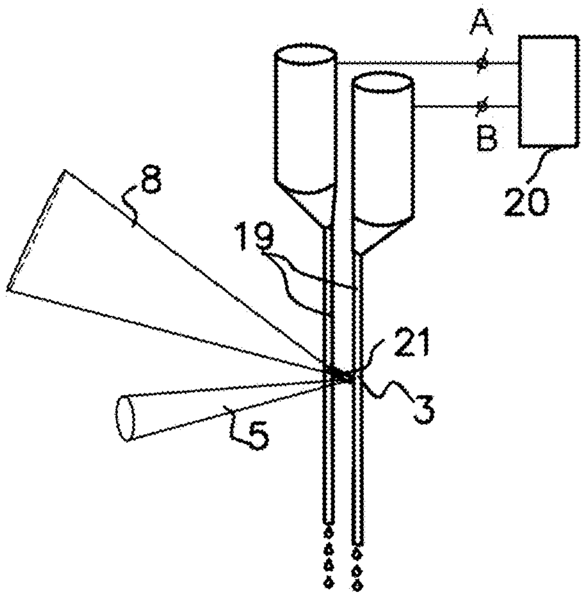

In another embodiment, shown in FIG. 8B, two high-speed liquid metal jets are used as electrodes 19 connected to a pulsed power source 20 to produce a laser-initiated discharge plasma 21 in vapors of the target material of target 3.

Figure 8C:
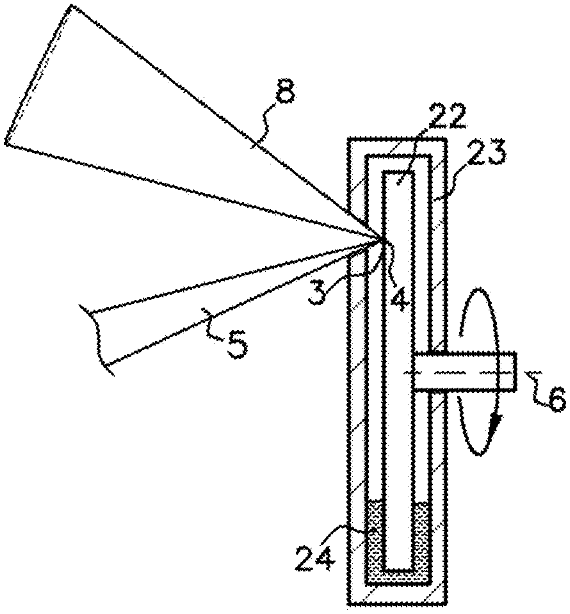

In another embodiment, shown in FIG. 8C, the LPP EUV light source is shown in which the target material of the target 3 is delivered into interaction zone 4 by a fast rotating disk 22 with a casing 23, in which there are holes for the input of laser beam 5, and exit of EUV radiation beam 8. Outside the interaction zone 4, the disk 22 is wetted with the molten target material 24.

Figure 8D:
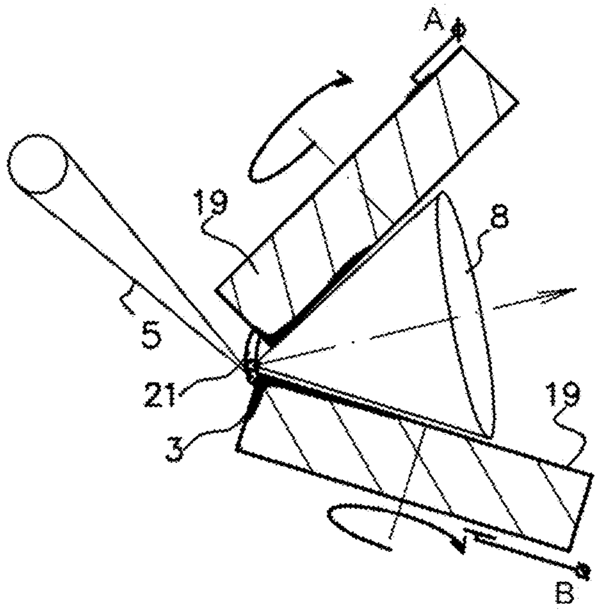

Similarly, in the embodiment illustrated by FIG. 8D, two fast rotating disks 22 wetted with molten target material are used as electrodes 19 to produce a laser-initiated discharge produced plasma 21 in vapors of the target material of target 3.

Thus, the present invention may make it possible to create monochromatic EUV light sources at a wavelength of 13.5 nm characterized by high spectral brightness and average power, long service life and ease of use.

INDUSTRIAL APPLICATION

The proposed devices are intended for a number of applications, including microscopy, materials science, X-ray diagnostics of materials, biomedical and medical diagnostics, inspection of nano- and microstructures and lithography, including actinic control of lithographic EUV masks.

The invention claimed is:

1. A plasma source of EUV radiation, wherein the plasma source is configured to produce a plasma as either a laser produced plasma or a laser-initiated discharge produced plasma, the plasma source comprising a target material to produce the plasma, wherein the target material comprises a lithium, Li, -based composition with at least one further element, wherein the composition is an alloy and wherein the at least one further element is selected from the group consisting of Ag, Au, Bi, Ba, Sr, wherein a type and an amount of the at least one further element in the composition is configured to increase a density of the target material by more than three times compared to a density of Li.

2. The plasma light source according to claim 1, wherein the composition comprises an eutectic alloy.

3. The plasma light source according to claim 1, wherein an atomic percentage of Li in the target material is in a range from 60% to 90%.

4. The plasma light source according to claim 1, wherein an atomic percentage of the at least one further element in the target material is in a range from 10% to 40%, preferably from 15% to 30%, wherein preferably, a sum of an atomic percentage of Li and of the at least one further element in the target material amount to about 100%.

5. The plasma source according to claim 1, wherein the plasma source is configured such that a speed of a droplet fraction of debris particles ejected from the plasma of the target material is less, preferably multiple times less, more preferably about an order of magnitude less, compared to a speed of a droplet fraction of debris particles ejected from a plasma of a lithium target.

6. The plasma source according to claim 1, in which a speed of a target (3) including the target material is greater or equal to an average speed of a droplet fraction of debris particles ejected from the plasma.

7. A laser produced plasma EUV source comprising: a vacuum chamber (1), a rotating target assembly (2) configured to supply a target (3) into an interaction zone (4) with a laser beam (5) focused onto the target (3), wherein the target (3) is a layer of molten target material on a surface of an annular groove implemented in the rotating target assembly (2) with a target surface facing a rotation axis (6) of the rotating target assembly (2), wherein the laser produced plasma EUV source is configured to pass an EUV radiation beam (8) exiting the interaction zone (4), and means for debris mitigation (10, 11, 12, 13, 14, 15), wherein the laser produced plasma EUV source comprises a plasma source according to claim 1, and a linear velocity of the target is preferably not less than 100 m/s.

8. The laser produced plasma EUV source according to claim 7, wherein a spectral purity filter is installed in a way of the EUV radiation beam.

9. The laser produced plasma EUV source according to claim 7, further comprising a spectral purity filter selected from a group comprising: a reflective filter in a form of a multilayer Mo/Si mirror (9), foil containing zirconium or beryllium.

10. The laser produced plasma EUV source according to claim 7, wherein the means of debris mitigation is provided by one or more debris mitigation techniques comprising: a protective gas flow, a magnetic mitigation, a foil trap, a debris shield, a membrane mostly transparent for EUV radiation.

11. A method for generating extreme ultraviolet, EUV, radiation, comprising: generating a radiation beam having a wavelength in an EUV range by means of a plasma source accord to claim 1.

12. The method according to claim 11, further comprising:

forming under an action of a centrifugal force a target (3) as a layer of the target material in a molten state on a surface of an annular groove that is implemented in a rotating target assembly (2) with a target surface facing a rotation axis (6) of the rotating target assembly (2);

irradiating the target (3) by a focused laser beam (5);

generating a laser produced plasma in an interaction zone (4); and outputting an EUV radiation beam (8) through means for debris mitigation (10, 11, 12, 13, 14, 15), wherein the target (3) is preferably rotated at a high linear velocity, not less than 100 m/s.

13. The method according to claim 12, wherein a centrifugal acceleration of the target (3) is at least 10000 g, where g is an acceleration of gravity.

14. The method according to claim 12, wherein a spatial distribution of a debris ejection rate from the interaction zone (4) is calculated and directions of a passage of both focused laser beam (5) and the EUV radiation beam (8) are selected in spatial regions with minimal debris ejection rates.

15. The method according to claim 12, wherein the debris mitigation is provided by one or more debris mitigation techniques comprising: a protective gas flow (13), a magnetic mitigation (14), a foil trap, a debris shield (12), a membrane mostly transparent for EUV radiation (15) with a transparency of more than 60%.

16. The method according to claim 12, wherein in the EUV radiation beam (8) a spectral filtering of narrow-band radiation is provided at a transition of ionized $Li^{2+}$ with a wavelength of 13.5 nm.

* * * * *